(12) United States Patent
Inget

(10) Patent No.: US 8,561,238 B1
(45) Date of Patent: Oct. 22, 2013

(54) HITCH RECEIVER MOUNTED TAILGATE RAMP

(76) Inventor: Ronald Inget, Mobile, AL (US)

( * ) Notice: Subject to any disclaimer, the term of this patent is extended or adjusted under 35 U.S.C. 154(b) by 288 days.

(21) Appl. No.: 12/614,198

(22) Filed: Nov. 6, 2009

(51) Int. Cl.
*E01D 1/00* (2006.01)
*B65F 1/00* (2006.01)

(52) U.S. Cl.
USPC ............................................ 14/71.1; 414/537

(58) Field of Classification Search
USPC ............... 14/69.5, 71.1; 280/166, 163, 164.1; 224/519–521; 414/537
See application file for complete search history.

(56) References Cited

U.S. PATENT DOCUMENTS

| | | | | |
|---|---|---|---|---|
| 4,394,947 A * | 7/1983 | Tartaglia | | 224/519 |
| 5,287,579 A * | 2/1994 | Estevez, Jr. | | 14/71.1 |
| 5,451,088 A * | 9/1995 | Broad | | 296/26.08 |
| 5,649,732 A * | 7/1997 | Jordan et al. | | 296/26.1 |
| 5,676,292 A * | 10/1997 | Miller | | 224/524 |
| 5,950,890 A * | 9/1999 | Darby | | 224/402 |
| 6,250,874 B1 * | 6/2001 | Cross | | 414/537 |
| 6,533,337 B1 * | 3/2003 | Harshman et al. | | 296/26.08 |
| 6,536,822 B1 * | 3/2003 | Vagedes et al. | | 296/26.1 |
| 6,769,583 B1 * | 8/2004 | Gordon et al. | | 224/506 |
| 8,292,565 B1 * | 10/2012 | Ruff et al. | | 414/480 |
| 2002/0088065 A1 * | 7/2002 | Schmaltz et al. | | 14/69.5 |
| 2004/0232185 A1 * | 11/2004 | Darby | | 224/521 |
| 2006/0133915 A1 * | 6/2006 | Day | | 414/537 |
| 2008/0265600 A1 * | 10/2008 | Barker | | 296/3 |
| 2010/0025955 A1 * | 2/2010 | Carr, Jr. | | 280/166 |
| 2010/0032918 A1 * | 2/2010 | Chamoun | | 280/30 |

* cited by examiner

*Primary Examiner* — Thomas B Will
*Assistant Examiner* — Abigail A Risic
(74) *Attorney, Agent, or Firm* — Michael I. Kroll

(57) ABSTRACT

A hitch receiver mountable tailgate ramp for loading and unloading heavy articles by wheeling said articles into and from the truck bed via said ramp. Once deployed the ramp has an arched shape to displace the load during use between the ramp's surface engaging edge and the hitch mount thereby providing a ramp with a greater load capacity than similar linear ramps. When not in use the ramp can be folded into an upright position substantially coplanar with the truck's closed tailgate. In operation the ramp is extended by pivoting the interior ramp segment until the ramp is in its arched position while the articulated post is lowered into its linear position.

10 Claims, 8 Drawing Sheets

HITCH RECEIVER MOUNTED TAILGATE RAMP

BACKGROUND OF THE INVENTION

1. Field of the Invention

The present invention relates generally to ramps and, more specifically, to a hitch receiver mountable tailgate ramp providing means for loading and unloading heavy articles by wheeling said articles, such as snow blowers, motorcycles, etc. up and down the ramp as desired.

The ramp has an arched shape when deployed to displace the load during use between the ramp's surface engaging edge and the hitch mount thereby creating a ramp with a greater load capacity as opposed to a linear segmented ramp. Furthermore, the pinned ramp prevents casual displacement of the ramp during use.

An articulated arm has a post portion mountable within a vehicle hitch receiver with pivotal ramp segments hingedly mounted thereto. When not in use the ramp can be folded into an upright position substantially coplanar with the truck's closed tailgate.

In operation the ramp is extended by pivoting the interior ramp segment until the ramp is in its arched position while the articulated post is lowered into its linear position. Once deployed the tailgate is lowered wherethen the articulated arm can be extended or retracted and pinned so that the lip of the ramp is approximate the edge of the tailgate.

2. Description of the Prior Art

There are other ramp devices designed for trucks. Typical of these is U.S. Pat. No. 3,352,440 issued to Wilson on Nov. 14, 1967.

Another patent was issued to Stenson on Feb. 15, 1972 as U.S. Pat. No. 3,642,156. Yet another U.S. Pat. No. 4,478,549 was issued to Stelly, et al. on Oct. 23, 1984 and still yet another was issued on Dec. 28, 1993 to Belnap et al. as U.S. Pat. No. 5,273,335.

Another patent was issued to Floe on Jul. 23, 1996 as U.S. Pat. No. 5,538,308. Yet another U.S. Pat. No. 5,540,474 was issued to Holland on Jul. 30, 1996 Another was issued to Jordan et al. on Jul. 22, 1997 as U.S. Pat. No. 5,649,732 and still yet another was issued on Jun. 20, 2000 to Blankenship et al. as U.S. Pat. No. 6,076,215.

Another patent was published to Ives on Jan. 24, 1999 as Canadian Patent No. CA2,211,349. Yet another U.K. Patent No. GB2215301 was published to Thelwell on Sep. 20, 1989. Another was published to Meighen on Mar. 3, 2001 as Canadian Patent No. CA 2281322 and still yet another was published on Mar. 19, 2004 to Tremblay as U.S. Pat. No. 2,441,358.

U.S. Pat. No. 3,352,440

Inventor: Merton Wilson

Issued: Nov. 14, 1967

A foldable ramp adapted to be attached to the tail gate of a truck, said ramp comprising: upper and lower, generally rectangular ramp portions, each of said ramp portions including a rigid frame and a ramp load supporting surface affixed to said frame; means for attaching said upper ramp portion to a tailgate; and a hinge assembly hingedly connecting said upper and lower ramp portions to permit positioning said ramp portions in edge abutting and co-planar relation and to permit folding said ramp portions into generally opposed, spaced relation adapted to sandwich the tailgate of a truck therebetween.

U.S. Pat. No. 3,642,156

Inventor: Raymond A. Stenson

Issued: Feb. 15, 1972

A folding ramp device for attachment to the rear gate of pickup trucks. This device is of such construction so as it may fold up while not interfering with the normal use of the endgate of the truck. The device includes a multiple number of folding members which are hinged to make a convenient ramp for any hard to load items, such as garden tractors, snowmobiles, etc.

U.S. Pat. No. 4,478,549

Inventor: Curtis Stelly, et al

Issued: Oct. 23, 1984

Foldable ramp for on and off loading all terrain/recreational vehicles from the rear of trucks, trailers, and vans. The ramp folds longitudinally to a width smaller than the wheelbase of the all terrain/recreational vehicles. When folded it may be slipped between the wheels of the all terrain/recreational vehicle for storage on the bed of the truck, trailer or van. When operational the ramp is engaged against the rear of the truck, trailer or van and allows the operator of the all terrain/recreational vehicle to either ride or push the vehicle onto or off of the truck, trailer, or van.

U.S. Pat. No. 5,273,335

Inventor: Philip Belnap

Issued: Dec. 28, 1993

A combination ramp and tailgate structure is disclosed for installation and use in pickup trucks in which the structure would replace a conventional tailgate. The ramp/tailgate structure includes first, second, third and fourth generally rectangular frame members, the first and second of which are slidably coupled together to move between a nested or collapsed position and an extended position, and a third and fourth of which are likewise slidably coupled together to move between a nested or collapsed position and an extended position. The slidable movement between frame members is in the planes thereof so that a low profile, compact configuration may be maintained when in the collapsed position, yet allows sufficient thickness of the members to permit the ramp to support heavy loads. When the frame members are in nested positions and when the third frame member is pivoted into a position against and parallel with the second frame member, the frame members may be pivoted as a unit to an upright position to serve as a conventional tailgate. When the frame members are moved respectively to their extended positions and when the third frame member is pivoted so that all frame members are generally parallel in the same plane, with a rearward side or edge of the fourth frame member in contact with the ground, the ramp/tailgate serves as a ramp extending from the ground to the bed of the pickup truck.

U.S. Pat. No. 5,538,308

Inventor: Wayne G. Floe

Issued: Jul. 23, 1996

An improved portable ramp structure constructed of lightweight material and adapted for reliable and safe use with various transport vehicles is described. A plurality of pairs of longitudinal support members having longitudinal channels for mounting a predetermined number of cross members therebetween are shown, with ones of each of said pairs hingedly mounted to associated ones of other pairs, such the ramp may be longitudinally folded. Each of said pairs of members has a support member mounted at one end thereof for cooperating with some portion of a transport vehicle. Retention chains with associated hooks are described for removably attaching the ramp structure to the transport vehicle. The entire structure is comprised of components that are fabricated from extruded lightweight material, and cut to length for assembly.

U.S. Pat. No. 5,540,474

Inventor: Richard T. Holland

Issued: Jul. 30, 1996

A ramp is provided for use with vehicles having tailgates. The ramp is attached to the tailgate. The ramp is capable of folding into a bed of the vehicle and against the tailgate when not in use, and is folded away from the vehicle and the tailgate to extend toward the ground or other loading surface for use. A hinge controls the movement of the device relative to the tailgate of the vehicle to allow the device to be pivoted into position for use, and to be pivoted into the storage position against the tailgate.

U.S. Pat. No. 5,649,732

Inventor: Gary Wayne Jordan

Issued: Jul. 22, 1997

A ramp system for loading or unloading trucks, vans, or other vehicles which are equipped with a trailer hitch receiver. The ramp system of the present invention includes a ramp support, one or more ladder-like ramps, and a corresponding number of ladder-like bridging pieces. The ramp support includes a L-shaped support frame which attaches to the trailer hitch receiver, and supports a horizontal ramp support bar at about the height of the cargo bed of the vehicle. One end of each ladder-like ramp has rings which fit around the horizontal ramp support bar. The other end of each ramp is rested on the ground, thus providing an inclined ramp for moving loads on to or off of the cargo bed of the vehicle. One end of each bridging piece hooks to the horizontal support bar while the other end rests on the cargo bed of the vehicle.

U.S. Pat. No. 6,076,215

Inventor: Lowell E. Blankenship et al

Issued: Jun. 20, 2000

A loading apparatus and method for attaching and mounting a loading ramp to a hitch receiver of a pickup truck, van or similar vehicle. An attachment apparatus is comprised of a receiver bar, a support structure, a ramp and a clamping plate for clamping the support structure to the opened tailgate of the pickup truck. The apparatus provides an attachment and also provides for load sharing between the receiver and the tailgate.

Canada Patent Number CA2,211,349

Inventor: Michael Ives

Published: Jan. 24, 1999

A tailgate ramp system comprising a pair of ramp members and an anchor bar which is removably attachable to the latch bolts or to the latch mechanisms on the tailgate of a pickup truck. The anchor bar of the present invention comprises a C-shaped, angle-iron structure having a stem member and two arm members pointing at right angle from the stem member, one at each extremity of the stem member. There is also provided an anchor rod affixed to the stem member for retaining the upper ends of the ramp members extending downward from the tailgate. In a first variant of the anchor bar, each arm member has an opening therein which corresponds in shape and location relative to the length of the stem to a configuration and spacing of one of the latch bolts on the tailgate relative to a width of the tailgate. In a second variant of the anchor bar, each arm member has a pin mounted thereon for engagement with pin-latching mechanisms of modern tailgates having such closures. These pins correspond in shape and location relative to the length of the stem member to a configuration and spacing of the pin-latching mechanisms relative to a width of the tailgate. The tailgate ramp system of the present invention including an anchor bar of a first or a second variant is thereby mountable on conventional tailgates having latch bolts or on newer tailgates having pin-latching mechanisms.

U.K. Patent Number GB2215301

Inventor: Mark Thelwell

Published: Sep. 20, 1989

A ramp (10) for loading a vehicle comprises multiple tread members (14) which are pivotally connected together in such a manner that when in use they can be arranged in edge to edge coplanar disposition forming a flat ramp surface. When not in use the ramp (10) can be conveniently folded away by overlapping the tread members (14) into face to face disposition.

Canada Patent Number CA2281322

Inventor: Pierre Meighen

Published: Mar. 3, 2001

A vehicle tailgate ramp system is described herein. The vehicle tailgate ramp system comprises two long ramp members and two short ramp members. Each of the two short ramp members can be attached to one of the two long ramp members to form a ramp assemblies. The system also includes a housing to be mounted in a vehicle tailgate. The two long ramp members and the two short ramp members are so configured and sized as to be housed altogether in the housing for carrying.

Canada Patent Number CA2441358

Inventor: Daniel Tremblay

Published: Mar. 19, 2004

A crossbar is affixed to an anchor member having a draw bar pointing forward for engagement into a hitch socket of a pickup truck. The crossbar has a pivot bracket affixed to the mid-point thereof, and a pair of hinge pins affixed to both ends thereof. A pair of spaced-apart ramp members are affixed to the hinge pins for angular movement thereof perpendicular to the crossbar. A mast is also movably affixed to the pivot bracket for angular movement thereof perpendicular to the crossbar between the ramp members, between a vertical position and a position below the ramp members in the deployed mode. A hitch arm extends from the mast and has a hitch clamp thereon for engagement with a hitch ball on a transportable vehicle, for retaining the transportable vehicle to the mast, to the draw bar and to the hitch socket of a pickup truck.

While these ramps may be suitable for the purposes for which they were designed, they would not be as suitable for the purposes of the present invention, as hereinafter described.

SUMMARY OF THE PRESENT INVENTION

A primary object of the present invention is to provide a foldable tailgate ramp for a pickup truck.

Another object of the present invention is to provide a foldable ramp for a pickup truck that is releasably securable to a vehicle hitch.

Still another object of the present invention is to provide a foldable tailgate ramp for a pickup truck with a hitch post having a doglegged configuration to raise the ramp to the level of the tailgate.

Yet another object of the present invention is to provide a foldable ramp incorporation means for preventing sagging of the ramp while under a load.

Still yet another object of the present invention is to provide a foldable ramp incorporating means for preventing casual displacement of the ramp from a desired location during use.

An additional object of the present invention is to provide a foldable ramp for a pickup truck having an articulated arm with hingedly attached ramp platform segments.

A further object of the present invention is to provide a foldable ramp wherein said articulated arm has a post portion insertable into a hitch receiver.

A yet further object of the present invention is to provide a foldable ramp wherein said insertable post portion has an aperture for securing said portion to the hitch receiver by means of a fastener.

A still yet further object of the present invention is to provide a foldable ramp wherein said articulated arm has a telescoping portion for moving the ramp toward or away from the truck tailgate with fastener means for fixing to a desired length.

Another object of the present invention is to provide a foldable ramp wherein said articulated arm has a pivotal joint whereby said articulated arm can be moved from a vertical stored position to a horizontal deployed position.

Yet another object of the present invention is to provide a foldable ramp having ramp platform segments with at least one segment fixedly attached to said articulated arm.

Still yet another object of the present invention is to provide a foldable ramp wherein said ramp platform segments are manufactured of a mesh material or a plate material.

An additional object of the present invention is to provide a foldable ramp having at least two ramp platform segments having a common hinge.

Another object of the present invention is to provide a foldable ramp wherein said hinged ramp platform segments form an arch when deployed to prevent sagging of the ramp under a load.

Yet another object of the present invention is to provide a foldable ramp wherein the distal ramp platform segment folds under the interior ramp platform segment during storage.

Still yet another object of the present invention is to provide a foldable ramp that is cost effective to manufacture.

Additional objects of the present invention will appear as the description proceeds.

The present invention overcomes the shortcomings of the prior art by providing a hitch receiver mountable tailgate ramp for loading and unloading heavy articles by wheeling said articles into and from the truck bed via said ramp. Once deployed the ramp has an arched shape to displace the load during use between the ramp's surface engaging edge and the hitch mount thereby providing a ramp with a greater load capacity than similar linear ramps. When not in use the ramp can be folded into an upright position substantially coplanar with the truck's closed tailgate. In operation the ramp is extended by pivoting the interior ramp segment until the ramp is in its arched position while the articulated post is lowered into its linear position. Once deployed the tailgate is lowered wherethen the articulated arm can be extended or retracted and pinned so that the lip of the ramp is approximate the edge of the tailgate.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
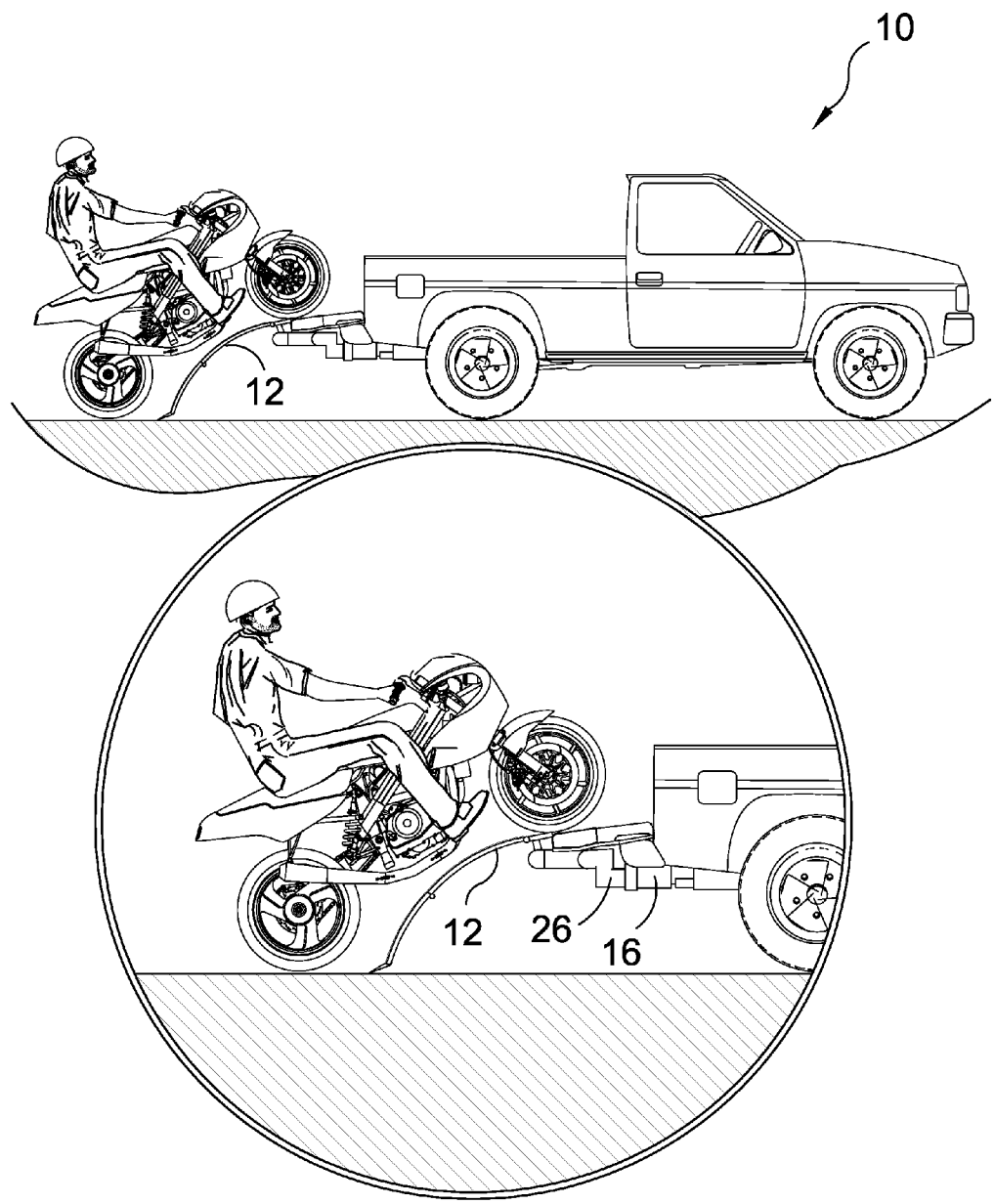
FIG. 1 is an illustrative view of the tailgate ramp of the present invention in use.

Turning now descriptively to the drawings, in which similar reference characters denote similar elements throughout the several views, the figures illustrate the Hitch Receiver Mounted Tailgate Ramp of the present invention. With regard to the reference numerals used, the following numbering is used throughout the various drawing figures.

- 10 Hitch Receiver Mounted Tailgate Ramp of the present invention
- 12 tailgate ramp
- 16 hitch receiver
- 18 articulated post
- 20 first ramp segment
- 22 second ramp segment
- 24 hinge
- 26 hitch post
- 28 telescopic post
- 30 pinning aperture
- 32 mesh ramp segment
- 34 solid plate ramp segment
- 36 tailgate
- 38 pivoting joint

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the tailgate ramp 12 of the present invention 10 in use. The present invention is a hitch receiver 14 mountable tailgate ramp providing means for loading and unloading heavy articles by wheeling said articles, such as snow blowers, motorcycles, etc. up and down the ramp as desired. The ramp 12 has an arched shape when deployed to displace the load during use between the ramp's surface engaging edge and the hitch post 26 thereby creating a ramp with a greater load capacity as opposed to a linear segmented ramp. Furthermore, the pinned ramp prevents casual displacement of the ramp during use.

Figure 2:
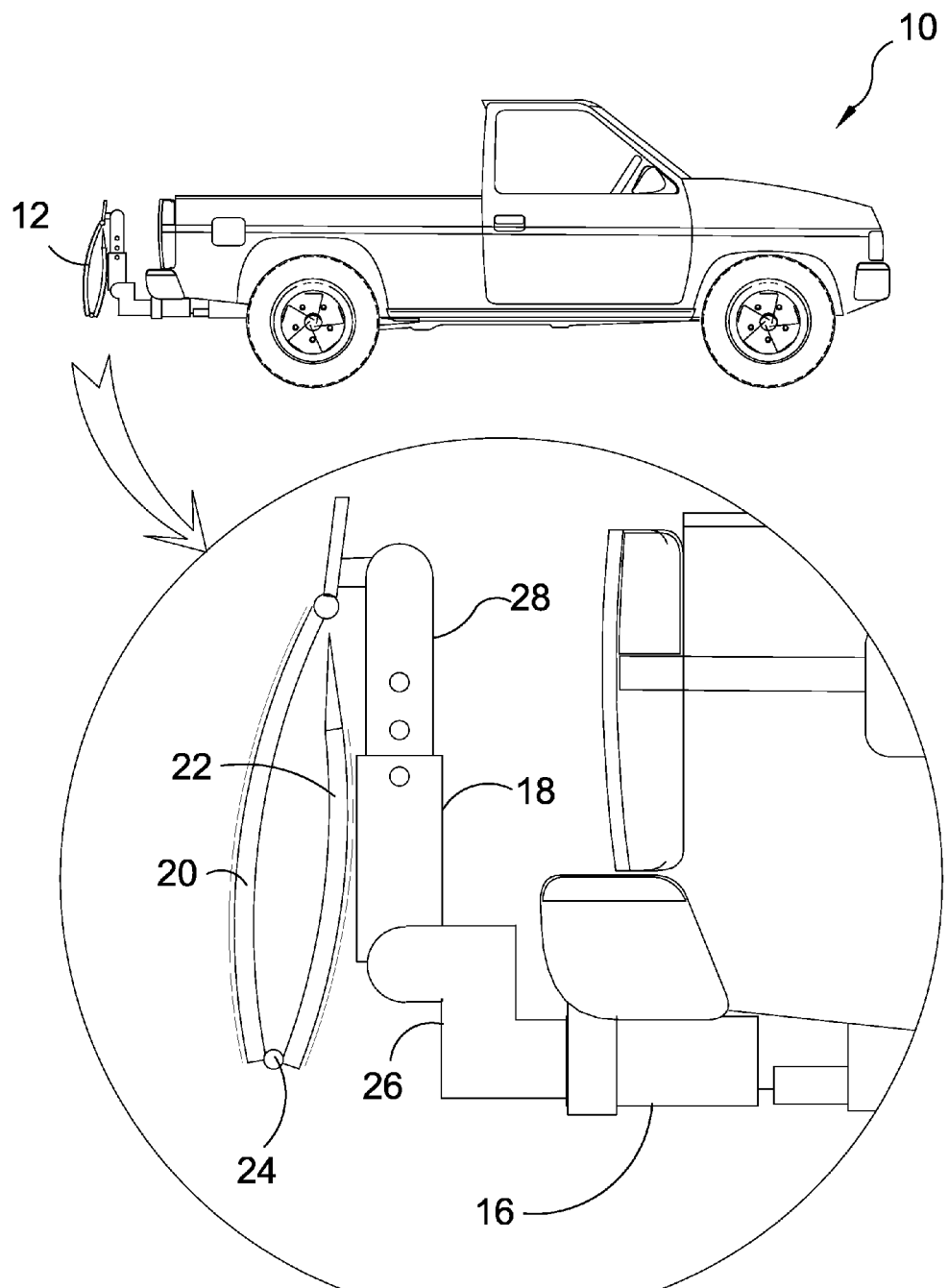
FIG. 2 is an enlarged view of the tailgate ramp of the present invention.

FIG. 2 is an enlarged view of the tailgate ramp 12 of the present invention 10. Illustrated is the present invention, a hitch receiver 14 mountable ramp 12 comprising a doglegged articulated post 18 mountable within a vehicle by means of a doglegged hitch post 26 having a first arcuate pivotal ramp segment 20 and a second arcuate ramp segment 22 hingedly 24 mounted thereto and connected to the articulated post 18 by a telescoping post 28. When not in use the ramp can be folded into an upright position substantially coplanar with the truck's closed tailgate.

Figure 3:
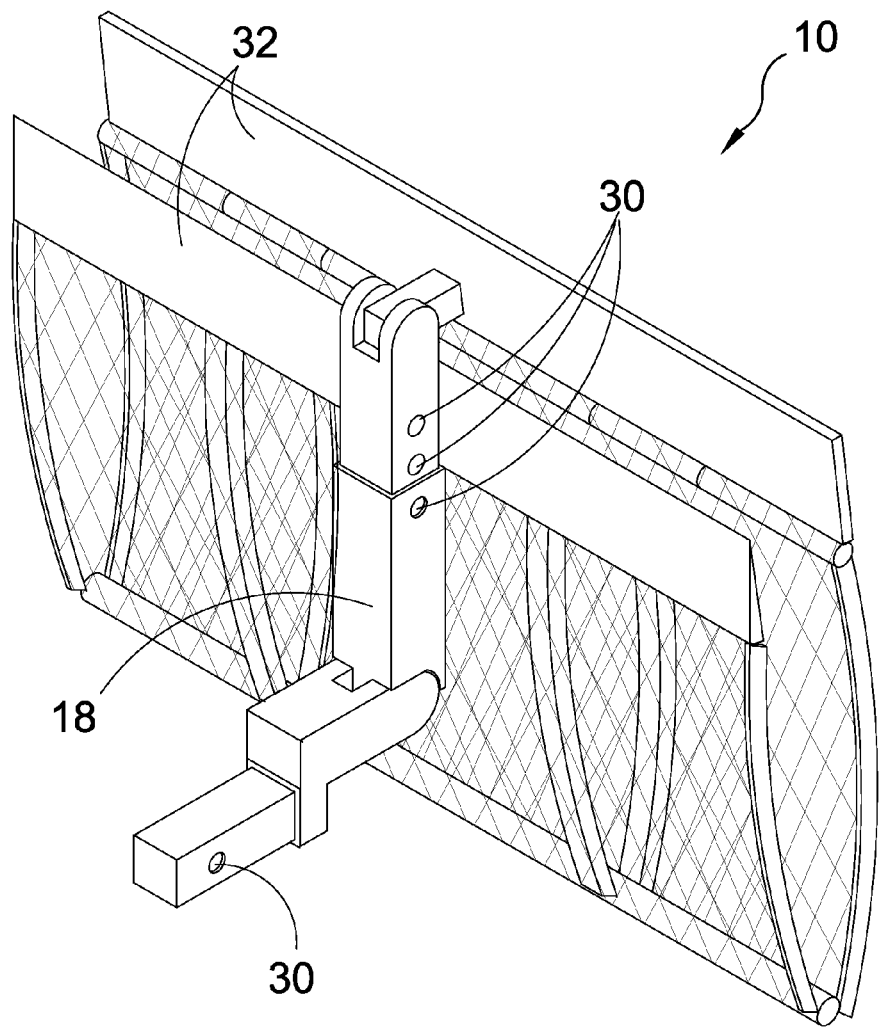
FIG. 3 is a perspective view of the hitch receiver mountable tailgate ramp.

FIG. 3 is a perspective view of the hitch receiver mountable tailgate ramp 10. As illustrated, the tailgate ramp has an articulated post 18 mountable within a hitch receiver so that the foldable ramp can be moved between an operative extended position and a folded stored position as desired. Also shown are pinning apertures 30 within the post for securing the post within the hitch receiver. The present invention also envisions the ramp segments as either mesh 32 or plate construction.

Figure 4:
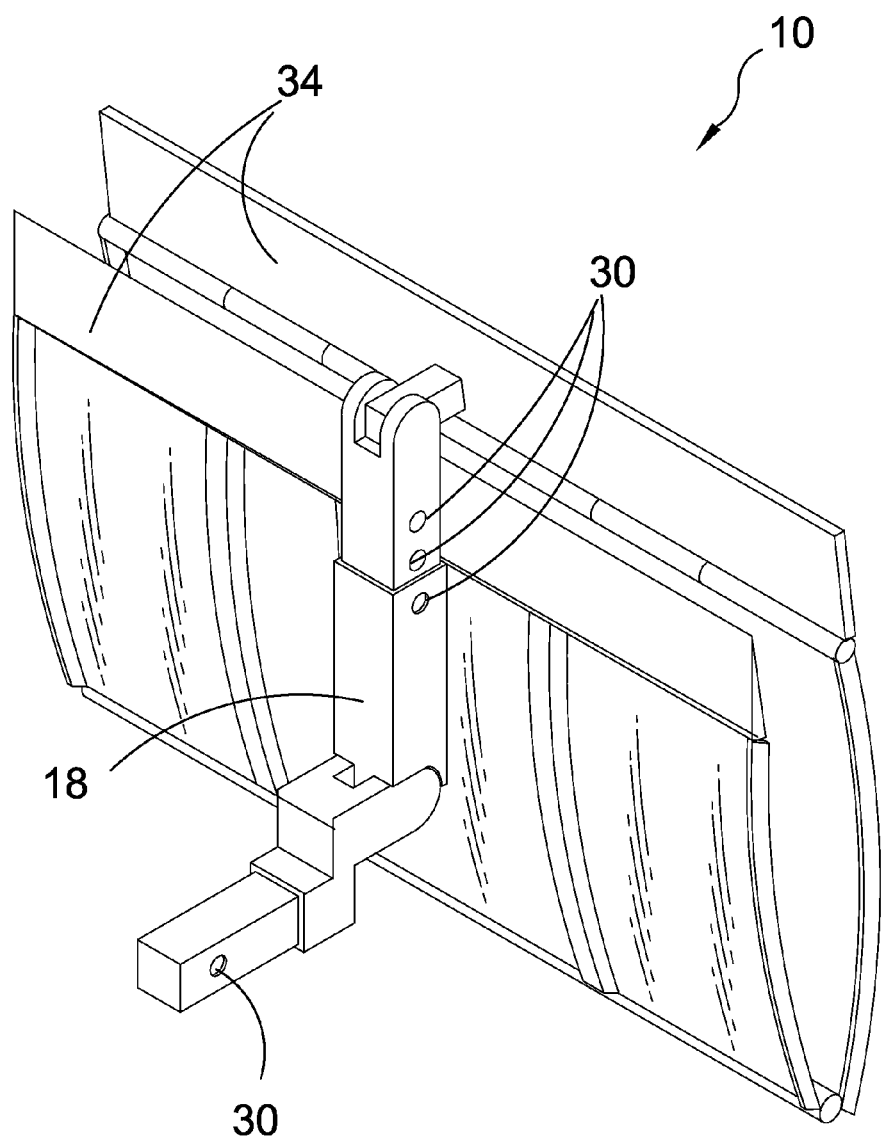
FIG. 4 is a perspective view of the hitch receiver mountable tailgate ramp.

FIG. 4 is a perspective view of the hitch receiver mountable tailgate ramp 10. As aforementioned, the tailgate ramp has an articulated post 18 mountable within a hitch receiver so that the foldable ramp can be moved between an operative extended position and a folded stored position. Also shown are pinning apertures 30 within the post for securing the post within the hitch receiver and the plate construction ramp segments 34.

Figure 5:
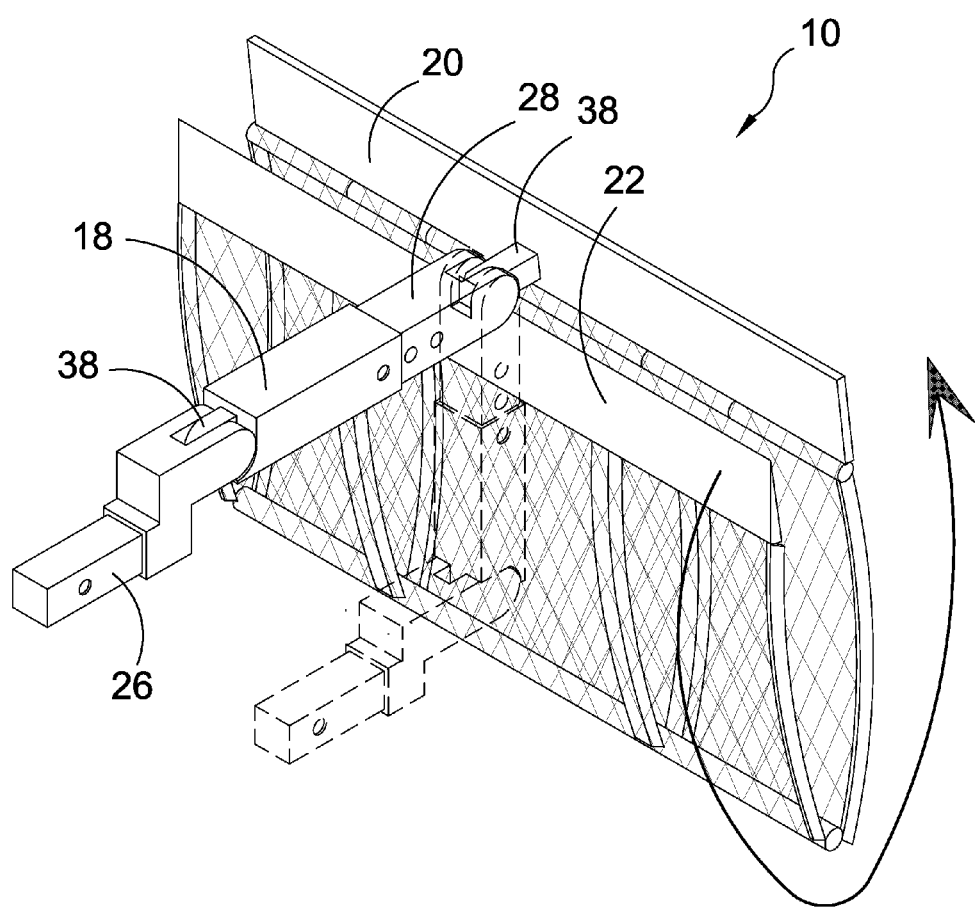
FIG. 5 is a perspective view of the tailgate ramp being deployed.

FIG. 5 is a perspective view of the present invention 10 being deployed. From a stored position the ramp is extended by pivoting the interior second ramp segment 22 until the ramp is in its arched position while the articulated post 18 is lowered into its linear position. Once deployed the tailgate is lowered wherethen the articulated arm 18 can be extended or retracted and pinned so that the lip of the ramp is approximate the edge of the tailgate. Pivoting joints 38 are provided at the points where the articulated post 18 engages the hitch post 26 and the telescoping post 28 is fastened to the first ramp segment 20. The doglegged configuration of the hitch post 26 raises the ramp to a substantially equal level with the tailgate.

Figure 6:
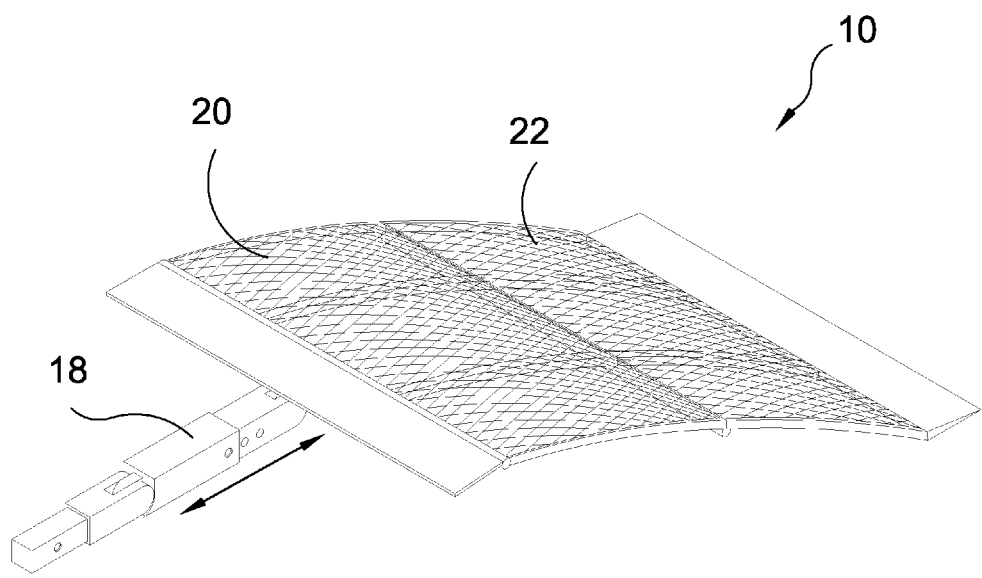
FIG. 6 is a perspective view of the tailgate ramp deployed.

FIG. 6 is a perspective view of the present invention 10 deployed. As aforementioned, the ramp is extended by pivoting the interior second ramp segment 22 until the ramp is in its arched position mating with the first ramp segment 20 while the articulated post 18 is lowered into its linear position. Once deployed the tailgate is lowered wherethen the articulated arm 18 can be extended or retracted and pinned so that the lip of the ramp is approximate the edge of the tailgate.

Figure 7:
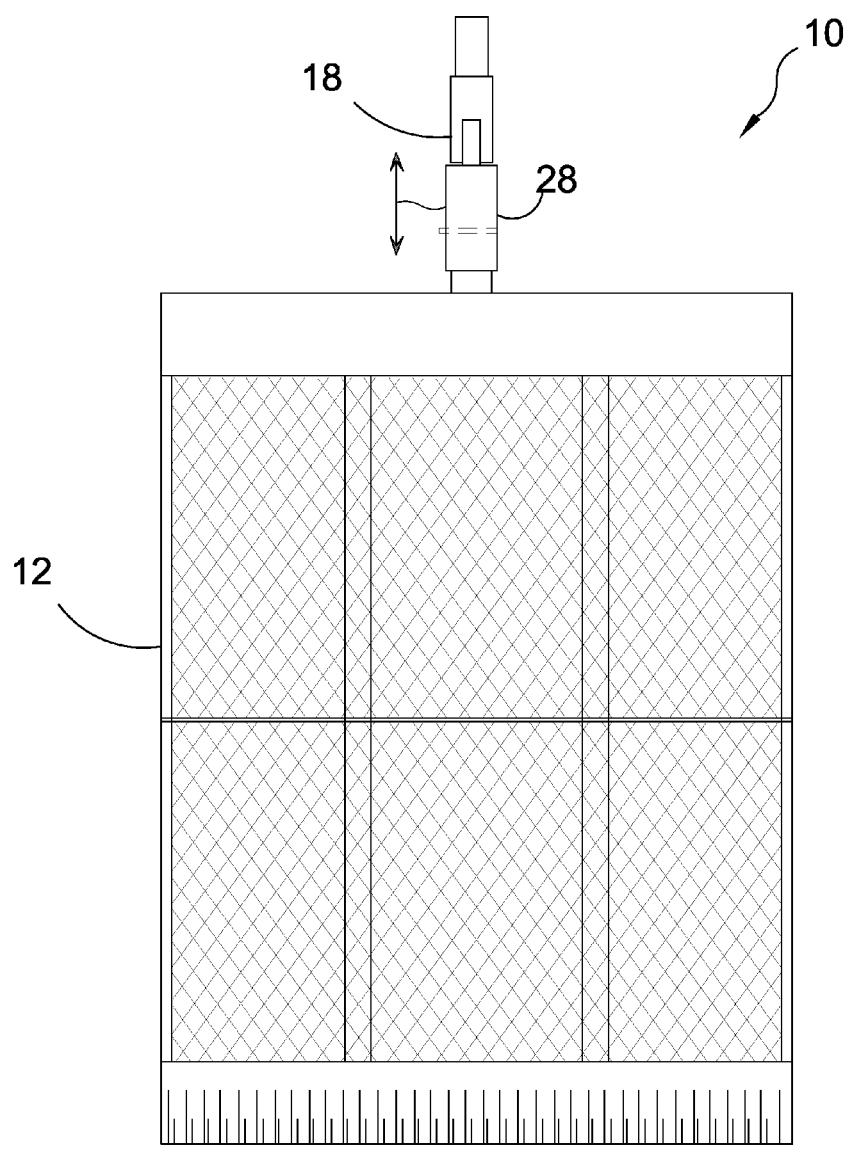
FIG. 7 is a top view of the foldable ramp of the present invention.

FIG. 7 is a top view of the foldable ramp of the present invention 10. Depicted is a top view of the tailgate ramp 12 deployed. The foldable ramp comprises an articulated arm 18 fixedly attached to one of the ramp platform segments. The articulated arm 18 provides means for moving the ramp platform segments from a stored position to a deployed position back to a stored position as needed. The arm is substantially hollow with a telescoping post 28 disposed therein to provides means for moving the ramp once deployed either forward or backward relative to the truck tailgate reducing the gap between the truck tailgate and the ramp edge.

Figure 8:
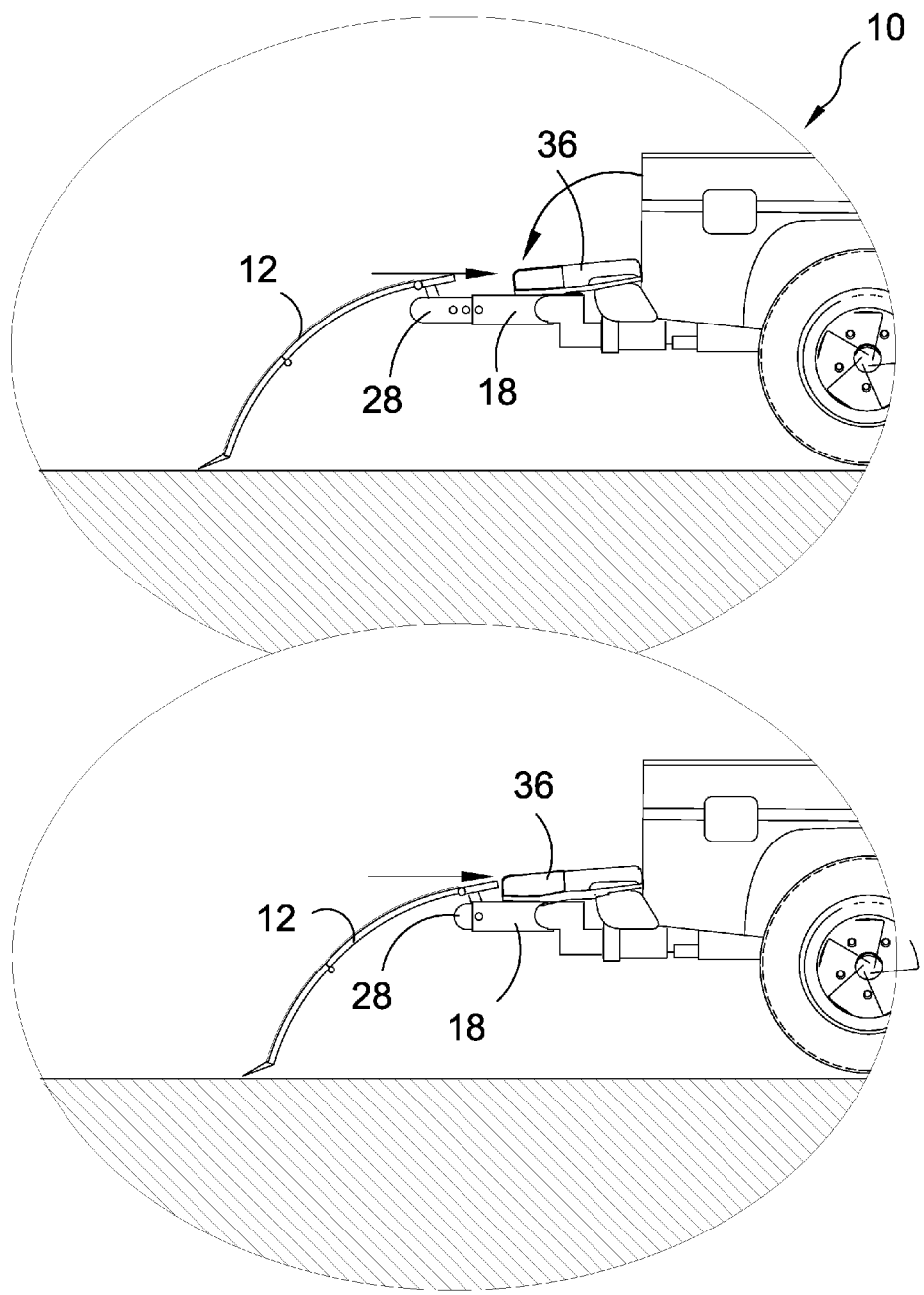
FIG. 8 is a perspective view of the tailgate ramp deployed.

FIG. 8 is a perspective view of the present invention 10 deployed. The ramp is extended by pivoting the interior ramp segment until the ramp is in its arched position while the articulated post 18 is lowered into its linear horizontal position. Once deployed the tailgate is lowered wherethen the telescoping post 28 can be extended or retracted and pinned so that the lip of the ramp 12 is approximate the edge of the tailgate 36.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A foldable hitch receiver tailgate ramp comprising:
   a) a hitch post having first and second ends, said first end inserted into and securing to a hitch receiver mounted under the tailgate and covered by said tailgate when said tailgate is deployed rearwardly;
   b) only a single articulated post pivotally attached to said second end of said hitch post, said single articulated post being substantially hollow, said articulated post having a retracted position extending upwardly from said hitch post where pivotally attached to said hitch post and substantially parallel to and spaced from said tailgate when in an up position, said articulated post having a deployed position extending rearwardly away from said tailgate substantially horizontally whereby when said tailgate is deployed rearwardly said articulated post is parallel to and spaced from said tailgate with a free edge of said articulated post extending beyond a free edge of said tailgate;
   c) a telescoping post with first and second ends, said first end of said telescoping post slidably residing within said single articulated post;
   d) a first arcuate ramp segment hingedly fastened to a second arcuate ramp segment;
   e) said first ramp segment having a first solid plate pivoted along a free edge of said first ramp segment, and with a pivotal connection between a mid section of said first solid plate and said second end of said telescoping post; and
   f) said second ramp segment having a second pivoted, solid plate along a free edge of said second ramp segment whereby when said ramp is deployed said first and second ramp segments are pivoted open to form a continuous riding surface, said second pivoted, solid plate provides a transition to said second ramp segment from a ground surface, and said first solid plate provides a transition from said first ramp segment to an upper surface of said tailgate when deployed rearwardly, said telescoping post being adjustable to allow any gap between said first solid plate and leading edge of said tail gate to be closed;
   g) whereby when in said retracted position of said tailgate ramp said second ramp segment extends upwardly between said first ramp segment and said upwardly extending articulated post, said articulated post being between said second ramp and said tailgate; and
   h) whereby when in a deployed position said first and second arcuate ramp segments form an outwardly convex riding surface.

2. The foldable hitch receiver tailgate ramp according to claim 1, wherein said slide means includes a pair of opposing pinning apertures.

3. The hitch receiver tailgate ramp according to claim 2, wherein said telescoping post has a plurality of opposing pinning apertures linearly arrayed to correspond with said pinning apertures disposed on said articulated post.

4. The hitch receiver tailgate ramp according to claim 1, wherein said hitch post has a pair of opposing pinning apertures corresponding with the pinning apertures of a hitch receiver of a vehicle for placement of a pinning element therethrough once aligned.

5. The hitch receiver tailgate ramp according to claim 4, wherein said ramp is deployed by pivoting said first ramp segment and swinging said second ramp segment outward thereby transferring said articulated post from the horizontal to the vertical position.

6. The hitch receiver tailgate ramp according to claim 5, wherein said pinning apertures of said telescopic post align with said pinning apertures of said articulated post and a fastening element is passed therethrough to prevent the casual displacement thereof.

7. The hitch receiver tailgate ramp according to claim 1, wherein the dogleg configuration of said hitch post elevates said ramp edge to an equivalent level with said tailgate.

8. The hitch receiver tailgate ramp according to claim 1, wherein said ramp segments comprise mesh plates.

9. The hitch receiver tailgate ramp according to claim 1, wherein said ramp segments comprise solid plates.

10. A method of deploying a ramp on the rear of a vehicle having a tailgate comprising the steps of:
   a) providing a dog leg configured hitch post having first and second ends, said first end inserted into and securing to a hitch receiver mounted under the tailgate of said vehicle and covered by said tailgate when said tailgate is deployed rearwardly;
   b) pivotally attaching an articulated post to said second end of said hitch post, said single articulated post being substantially hollow, said articulated post having a retracted position extending upwardly from said hitch receiver substantially parallel to and spaced from said tailgate when in an up position, said articulated post having a deployed position extending rearwardly away from said tailgate substantially horizontally whereby when said tailgate is deployed rearwardly said articulated post is parallel to and spaced from said tailgate with a free edge of said articulated post extending beyond a free edge of said tailgate;
   c) providing a telescoping post with first and second ends, said first end of said telescoping post slidably residing within said single articulated post;
   d) fastening a first arcuate ramp segment hingedly to a second arcuate ramp segment;
   e) providing said first ramp segment with a first solid plate along a free edge of said first ramp segment with a pivotal connection between a mid section of said first ramp segment and said second end of said telescoping post;
   f) providing said second ramp segment with a second pivoted, solid plate along a free edge of said second ramp segment, and with a pivotal connection along said free edge thereof to said second end of said telescoping post;
   g) deploying said ramp by pivoting said articulated post to a rearwardly extending direction, pivoting open said first and second ramp segments to form a continuous riding surface, pivoting said second pivoted solid plate to provide a transition from a ground surface to said ramp, and pivoting said first pivoted, solid plate to form a transition from said first ramp segment to an upper surface of said tailgate when deployed rearwardly from said vehicle, said first and second ramp segments forming an outwardly convex riding surface;
   h) retracting and stowing said ramp on said vehicle by moving said tailgate to an upward, closed position, rotating said articulated post to an upwardly extending position, and folding inwardly said first and second ramp segments with said second ramp segment up between said articulated post and said first ramp segment; and
   i) adjusting said telescoping post to close any gap between said first solid plate and leading edge of said tail gate when said ramp segments are deployed.

* * * * *